United States Patent
Blair

(10) Patent No.: US 7,881,216 B2
(45) Date of Patent: Feb. 1, 2011

(54) SYSTEMS AND METHODS FOR ANALYZING COMMUNICATION SESSIONS USING FRAGMENTS

(75) Inventor: Christopher D. Blair, South Chailey (GB)

(73) Assignee: Verint Systems Inc., Melville, NY (US)

( * ) Notice: Subject to any disclaimer, the term of this patent is extended or adjusted under 35 U.S.C. 154(b) by 635 days.

(21) Appl. No.: 11/540,353

(22) Filed: Sep. 29, 2006

(65) Prior Publication Data

US 2008/0080385 A1     Apr. 3, 2008

(51) Int. Cl.
*H04M 3/00*     (2006.01)

(52) U.S. Cl. ................................. 370/252; 379/265.06

(58) Field of Classification Search ................. None
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,012,519 A * | 4/1991 | Adlersberg et al. ......... 704/226 |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |

(Continued)

FOREIGN PATENT DOCUMENTS

EP     0453128 A2     10/1991

(Continued)

OTHER PUBLICATIONS

Notification of Transmittal of the International Search Report and the Written Opinion of the International Searching Authority, dated Apr. 11, 2008.

(Continued)

*Primary Examiner*—Steven H Nguyen
*Assistant Examiner*—Alex Skripnikov
(74) *Attorney, Agent, or Firm*—Lawrence A. Aaronson, PC

(57) ABSTRACT

Systems and methods for analyzing communication sessions using fragments are provided. In this regard, a representative method includes: delineating fragments of an audio component of a communication session, each of the fragments being attributable to a party of the communication session and representing a contiguous period of time during which that party was speaking; and automatically assessing quality of at least some of the fragments such that a quality assessment of the communication session is determined.

20 Claims, 4 Drawing Sheets

U.S. PATENT DOCUMENTS

| | | | |
|---|---|---|---|
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,946,375 A * | 8/1999 | Pattison et al. | 379/112.01 |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,049,776 A * | 4/2000 | Donnelly et al. | 705/8 |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Purnam et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,327,364 B1 * | 12/2001 | Shaffer et al. | 379/265.02 |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,915,246 B2 | 7/2005 | Gusler et al. | |
| 6,959,078 B1 | 10/2005 | Eilbacher et al. | |
| 6,965,886 B2 | 11/2005 | Govrin et al. | |
| 7,043,008 B1 | 5/2006 | Dewan | |
| 7,076,427 B2 * | 7/2006 | Scarano et al. | 704/270 |
| 7,664,641 B1 * | 2/2010 | Pettay et al. | 704/251 |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2003/0055883 A1 | 3/2003 | Wiles et al. | |
| 2003/0079020 A1 | 4/2003 | Gourraud et al. | |
| 2003/0144900 A1 | 7/2003 | Whitmer | |
| 2003/0154240 A1 | 8/2003 | Nygren et al. | |
| 2004/0100507 A1 | 5/2004 | Hayner et al. | |

| | | | |
|---|---|---|---|
| 2004/0117185 | A1 | 6/2004 | Scarano et al. |
| 2004/0165717 | A1 | 8/2004 | McIlwaine et al. |
| 2004/0249650 | A1* | 12/2004 | Freedman et al. ............... 705/1 |
| 2005/0138560 | A1 | 6/2005 | Lee et al. |
| 2007/0071206 | A1* | 3/2007 | Gainsboro et al. .......... 379/168 |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web pae, unverified print date of Apr. 1, 2002.
"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 811 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).

De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of May. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to Business".

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation . . . (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*Digital Broadcasting*, Interactive TV News.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCi-TECH, Dec. 4, 1997.

*Interactive TV Overview TimeLine*, Interactive TV News.

*Interactive TV Wars Heat Up*, Industry Standard.

Needle. *Will the Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, 093/28/96.

Kenny. *TV Meets Internet*, PC World Online, Mar. 28, 1996.

Linderholm. *Avatar Debuts Home Theater PC*, PC World Online, Dec. 1, 1999.

Mendoza. *Order Pizza WhileYyou Watch*, ABCNews.com.

Moody. *WebTV: What the Big Deal?*, ABCNews.com.

Murdorf, et al. *Interactive Television—Is There Life After the Internet?*, Interactive TV News.

Needle. *PC, TV or Both?*, PC World Online.

*Interview with Steve Perlman*, CEO of Web-TV Networks, PC World Online.

Press. *Two Cultures, The Internet and Interactive TV*, Universite de Montreal.

Reuters. *Will TV Take Over Your PC?*, Pc World Online.

Rohde. *Gates Touts Interactive TV*, InfoWorld, Oct. 14, 1999.

Ross. *Broadcasters Use TV Signals to Send Data*, PC World Oct. 1996.

Schlisserman. *Is Web TV a Lethal Weapon?*, PC World Online.

Stewart. *Interactive Television at Home: Television Meets the Internet*, Aug. 1998.

Swedlow. *Computer TV Shows: Ready for Prime Time?*, PC World Online.

Wilson. *U.S. West Revisits Interactive TV*, Interactive Week, Nov. 28, 1999.

Notification Concerning Transmittal of International Preliminary Report on Patentability and Written Opinion of the International Searching Authority, dated Apr. 9, 2009.

\* cited by examiner

SYSTEMS AND METHODS FOR ANALYZING COMMUNICATION SESSIONS USING FRAGMENTS

BACKGROUND

It is desirable in many situations to record communications, such as telephone calls. This is particularly so in a contact center in which many agents may be handling hundreds of telephone calls each every day. Recording of these telephone calls can allow for quality assessment of agents, improvement of agent skills and/or dispute resolution, for example.

In this regard, assessment of call quality is time consuming and very subjective. For instance, a telephone call may last from a few seconds to a few hours and may be only one part of a customer transaction or may include several independent transactions. The demeanor of the caller is also influenced by events preceding the actual conversation—for example, the original reason for the call; the time spent waiting for the call to be answered or the number of times the customer has had to call before getting through to the right person.

Assessing the "quality" of a telephone call is therefore difficult and subject to error, even when done by an experienced supervisor or full-time quality assessor. Typically, the assessment of a call is structured according to a pre-defined set of criteria and sub-criteria. Some of these may relate to the initial greeting, the assessment of the reason for the call, the handling of the core reason for the call, confirming that the caller is satisfied with the handling of the call, and leaving the call.

Automation of the assessment process by provision of standardized forms and evaluation profiles have made such assessment more efficient, but it is still impractical to assess more than a tiny percentage of calls. Moreover, even with a structured evaluation form, different assessors will evaluate a call differently with quite a wide variation of scores.

SUMMARY

In this regard, systems and methods for analyzing communication sessions using fragments are provided. An embodiment of such a system comprises. An embodiment of a method comprises: delineating fragments of an audio component of a communication session, each of the fragments being attributable to a party of the communication session and representing a contiguous period of time during which that party was speaking; and automatically assessing quality of at least some of the fragments such that a quality assessment of the communication session is determined.

An embodiment of such a system comprises a communication analyzer operative to: delineate fragments of an audio component of a communication session, each of the fragments being attributable to a party of the communication session and representing a contiguous period of time during which that party was speaking; and automatically assess quality of at least some of the fragments such that a quality assessment of the communication session is determined.

Computer readable media also are provided that have computer programs stored thereon for performing computer executable methods. In this regard, an embodiment of such a method comprises: delineating fragments of an audio component of a communication session, each of the fragments being attributable to a party of the communication session and representing a contiguous period of time during which that party was speaking; and automatically assessing quality of at least some of the fragments such that a quality assessment of the communication session is determined.

Other systems, methods, features and/or advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiments disclosed herein.

DETAILED DESCRIPTION

Systems and methods for analyzing communication sessions using fragments are provided. In this regard, several exemplary embodiments will be described in which a recording of a telephone call is divided into more manageable fragments. By way of example, each of the fragments can be configured as contiguous speech of a party of the call. Specific behaviors can, therefore, be identified automatically as each fragment can be assessed more easily and unambiguously than if the behaviors were attempted to be identified from within an undivided call. By automating the assessment of call quality, a higher proportion of calls can be analyzed and hence a higher proportion of problem behaviors, processes and issues identified and addressed with less effort and cost than alternative manual strategies.

Figure 1:
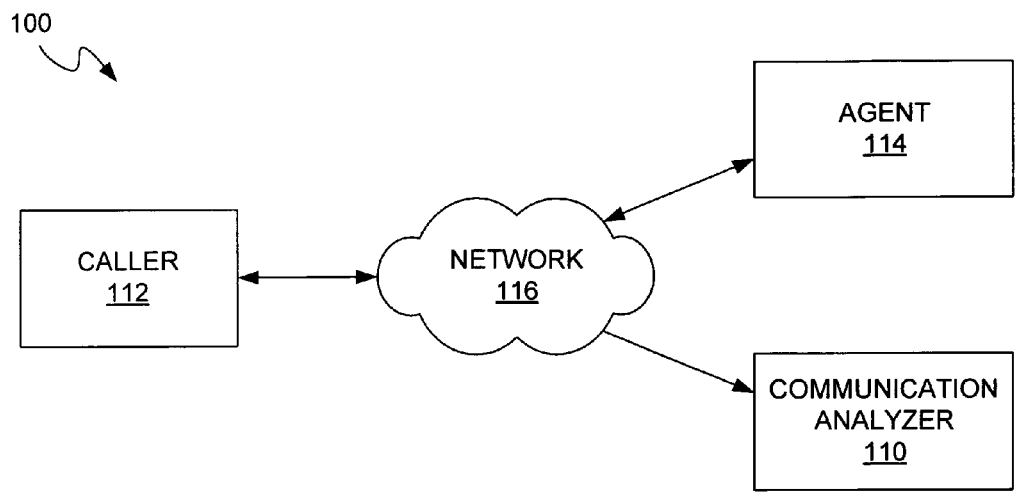
FIG. 1 is a schematic diagram illustrating an embodiment of a system for analyzing communication sessions using fragments.

In this regard, FIG. 1 is a schematic diagram illustrating an embodiment of a system for analyzing communication sessions using fragments. As shown in FIG. 1, system 100 incorporates a communication analyzer 110 that is configured to analyze audio components of communications. In FIG. 1, the audio component (not shown) is associated with a communication session that is occurring between a caller 112 and an agent 114 via a communication network 116. In this embodiment, the agent is associated with a contact center that comprises numerous agents for interacting with customers, e.g., caller 112.

One should note that network 116 can include one or more different networks and/or types of networks. As a non-limiting, example, communications network 116 can include a Wide Area Network (WAN), the Internet, and/or a Local Area Network (LAN). Additionally, the communication analyzer can receive information corresponding to the communication session directly or from one or more various components that are not illustrated in FIG. 1. By way of example, the information can be provided from a long term storage device that stores recordings of the communication session, with the recordings being provided to the storage device by a recorder. Additionally or alternatively, the recordings could be provided directly from such a recorder.

Figure 2:
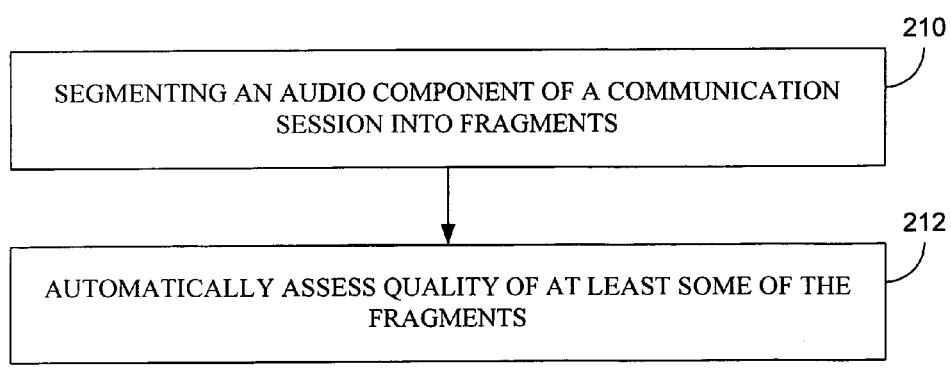
FIG. 2 is a flowchart illustrating functionality (or methods steps) that can be preformed by the embodiment of the system for analyzing communication sessions using fragments of FIG. 1.

In operation, the analyzer of FIG. 1 performs various functions (or method steps) as depicted in the flowchart of FIG. 2. As shown in FIG. 2, the functions include (as depicted in block 210) delineating an audio component of a communication session into fragments. In particular, in this embodiment, each of the fragments is attributable to a party of the communication session and represents a contiguous period of time during which that party was speaking. By way of example, one such fragment could involve a recording (e.g., 4 seconds in duration) of the speech of agent 114 during a communication session with customer 112, in which the agent greeted the customer. As shown in block 212, the analyzer also automatically assesses quality of at least some of the fragments such that a quality assessment of the communication session is determined.

In some embodiments, the parties to a communication session are recorded separately. In other embodiments, a session can be recorded in stereo, with one channel for the customer and one for the agent.

A vox detection analyzer of a communication analyzer can be used to determine when each party is talking. Such an analyzer typically detects an audio level above a pre-determined threshold for a sustained period (the "vox turn-on time"). Absence of audio is then determined by the audio level being below a pre-determined level (which may be different from the first level) for a pre-determined time (which may be different from the previous "turn-on" time). By identifying audio presence on each of the two channels of recording of a call results in a time series through the call that identifies who, if anyone, is talking at any given time in the series.

Once audio presence is determined, the call can be broken into "fragments" representing the period in which each party talks on the call. In this regard, a fragment can be delimited by one or more of the following:
 i) the start or end of the call;
 ii) the other party starting to speak and the previous party stopping speaking;
 iii) a "significant" pause—a period greater than a typical interval between one party finishing speaking and the other party beginning speaking. This interval may be pre-determined or determined by examining the actual intervals between the parties speaking on this call. If the call involves more than a few alternations of which party is speaking, these alternations can typically be grouped. For instance, one group could be "normal turns of dialog" in which the intervals are on the order of a fraction of a second to one or two seconds and another group could be "delays" in which the dialog is hesitant or significantly delayed for some reason; and
 iv) a "significant interruption"—a period during which both parties are speaking and which is longer than typical confirmatory feedback (e.g., "uh-huh") that is heard every few seconds in a normal interaction.

Figure 3:
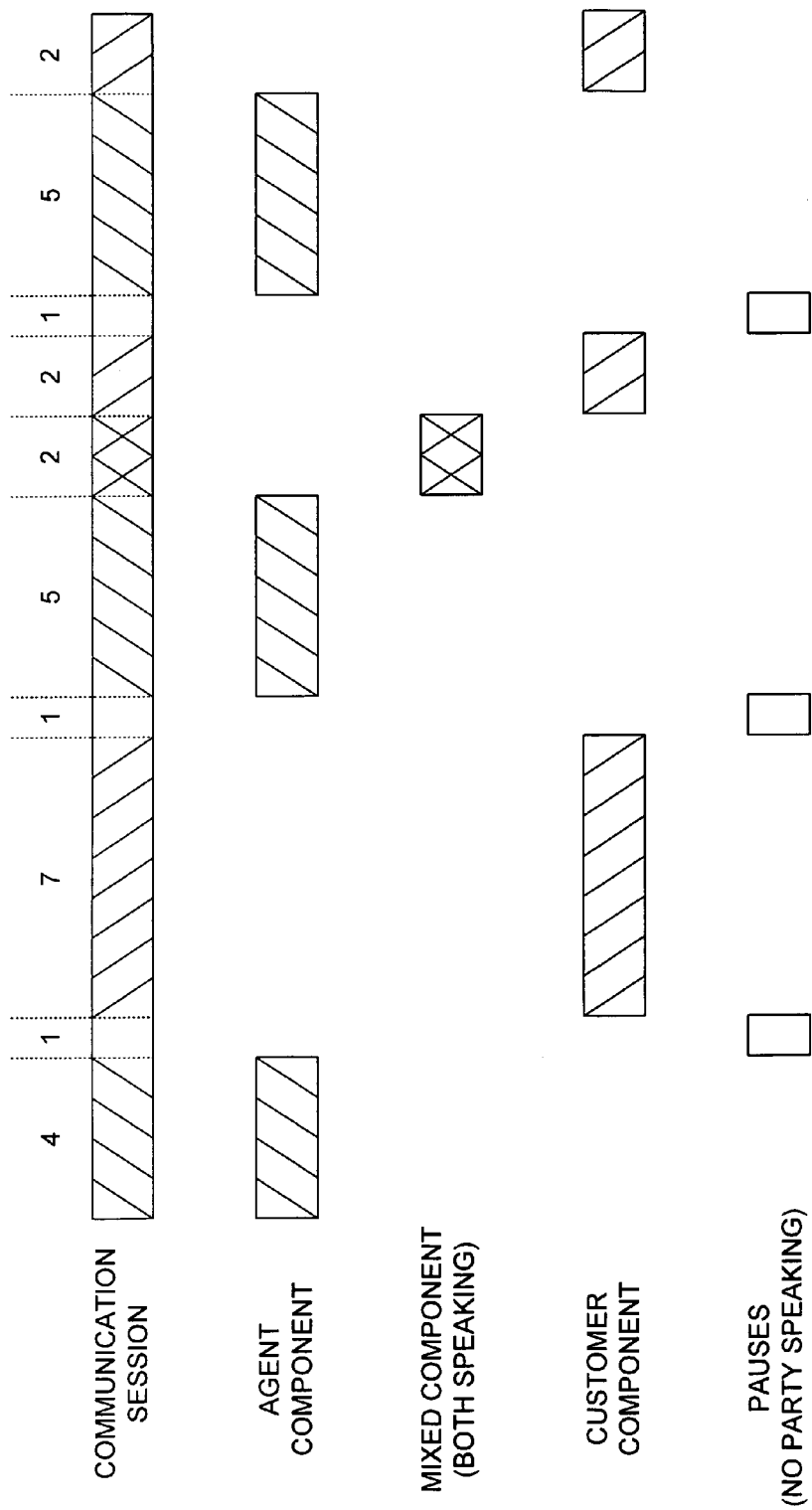
FIG. 3 is a schematic representation of an exemplary communication session and corresponding call fragments.

A schematic representation of an exemplary communication session and corresponding call fragments is depicted in FIG. 3. As shown in FIG. 3, the communication session is a sequence of audio components (depicted as blocks) of an interaction between an agent and a customer that takes place over a 30 second time period. In particular, the agent speaks for the first 4 seconds, followed by a 1 second pause. The customer then speaks for 7 seconds followed by a 1 second pause. Thereafter, the agent speaks for 7 seconds, the last 2 seconds of which the customer begins speaking, with the customer continuing to speak for another 2 seconds. After another 1 second pause, the agent speaks for 5 seconds after which, without pause, the customer speaks for 2 seconds and the communication session ends. Notably, although not shown in this example, the reason for delimiting the fragment can be correlated with the fragment itself (e.g., alongside the fragment) resulting in a sequence of records.

Having broken a call into fragments, the system can analyze the sequence and duration of the fragments. By way of example, for each fragment, some embodiments can determine one or more of the following:
 i) which party is speaking (customer or agent);
 ii) which party spoke in the previous fragment;
 iii) which party speaks in the next fragment;
 iv) the delay between the previous fragment and this one;
 v) the delay between this fragment and the next;
 vi) a link to the previous fragment;
 vii) a link to the next fragment;
 viii) a transcript of the words and/or phonemes contained within the fragment—determined by phonetic analysis using a phonetic analyzer and/or speech recognition analysis using a speech recognition engine;
 ix) a time sequence of the amplitude of the audio of the speaking party throughout the fragment;
 x) an estimate of periods of loud speech or shouting. This may be determined by the fact that the audio level clipped as well as or instead of exceeded a specified level or relative level compared to the call as a whole or the level of audio from the other party;
 xi) the time from the start of the call to the start of this fragment;
 xii) the duration of this fragment; and
 xiii) the time from this fragment to the end of the call.

In some embodiments, statistics of the call can be deduced from the individual call fragment data. These may include one or more of:
 i) number of call fragments;
 ii) number of times the speaker changed;
 iii) average duration of customer speaking;
 iv) average duration of agent speaking;
 v) percentage of total talk time that agent spoke;
 vi) percentage of total talk time that customer spoke;
 vii) percentage of total call time during which neither party spoke;
 viii) percentage of time that both parties spoke;
 ix) maximum duration of "interruptions"—defined for example, as periods of greater than 1 second during which both parties talked; and
 x) emotion indication—for example, pitch values and/or trends throughout the call.

As mentioned above, a communication analyzer can automatically assess quality of a communication session by assessing quality of at least some of its fragments. In order to accomplish quality assessment, various techniques can be used. By way of example, fragment training can be used, in which manual scoring is applied to one or more fragments and then the system applies comparable scoring to fragments that are evaluated to be similar.

In this regard, in some embodiments, individual fragments or sequences of two or more successive fragments are presented to the user of the system, typically with a clear indication of which party is speaking and the delay between the two fragments. The user listens to some or all of the fragments and then indicates, such as via a form on a screen provided by a scoring analyzer, whether the fragments relate to a good, bad or. "indifferent" interaction, for example. In many cases, the isolated fragments will not indicate a particularly good or bad experience but in a small percentage of cases such fragments can indicate a particularly good or bad experience. By way of example, a long delay between two successive fragments can be considered "bad" but in other cases, the words uttered, the tone or volume of the utterance may indicate a good or bad experience. This manual (human) assessment of the quality of the fragment sequence can be stored and used to drive machine learning algorithms.

In some embodiments, in contrast to a scoring of good, bad or indifferent, a continuous scale (e.g., 0-10 rating) can be used. Additionally, multiple criteria may be presented, each of which the user can choose to provide feedback on, such as "Customer empathy" and "Persuasiveness" for example. In many cases, any particular fragment or fragment pair will not be particularly good or bad but as long as those cases that are at one extreme or the other are identified, the system will receive valuable input.

In many cases, however, the fragments presented to the user may not show anything significant but may indicate that the previous or next fragments may provide more valuable input. Because of this, the user may be presented with controls that allow the user to play the previous and/or next fragment. Thus, the user can provide feedback on those fragments and/or move on to the next or previous fragment.

Where users assess whole calls, the overall quality assessment of the call and the individual criteria/sub-criteria may be noted. These are then applied to either all fragments or, where specific criteria are explicitly linked to particular regions of the call (e.g. "Quality of Greeting", "Confirmation of resolution"), to the fragments of the call according to a weighting function. In those embodiments that use weighting, a different weighting can be applied to each fragment according to the distance of that fragment from the start of the call, the end of the call, or from some other known point within the call. It should be noted that point from which the fragment is measured for weighting purposes can be identified by an event that occurred during the call. The fragment can be subsequently stored with a timestamp linking the fragment to that point, e.g., event, in the call.

As mentioned before, manual quality assessments can then be used by the system for enabling automated scoring of other fragments that have not been manually scored. Additionally or alternatively, some embodiments can be provided with a number of heuristics, such as predefined rules, that the system can use during automated analysis by a scoring analyzer. In this regard, such rules can involve one or more of the following:

i) calls in which the customer to agent speech ratio is >80/20 or less than 20/80 are scored as "bad";
ii) interruptions of >1 second are "bad";
iii) delays between fragments of >2 seconds are "bad"; and
iv) audio volumes above X are "bad".

The human input, e.g., predefined rules and/or examples of manually assessed calls/fragments, can be used as input for a variety of machine learning techniques such as neural nets and Bayesian filters expert systems, for example. By identifying the characteristics of the call fragments that lead to the assessments given, a system employing such a technique can learn to identify the relevant characteristics that differentiate "good" from "bad" calls.

An example of this approach is a Bayesian probability assessment of the content of a call fragment. In such an approach, a transcript of a call may be processed and the frequency of the occurrence of each word within the customer's speech is stored. The proportion of "good" fragments in which each word occurs and the proportion of "bad" fragments in which each word occurs is then noted. These probabilities can then be used to assess whether other fragments are likely to be "good" or "bad" based on the words within those and the likelihood of each of the words to be found in a "good" or "bad" fragment. From the many words within a given fragment, those that provide the strongest discrimination of good versus bad fragment can be used and the remainder discarded. Of the N strongest indicators, an overall assessment can be made of good versus bad.

Typically, the other attributes of a fragment, such as those described above, can be used as potential indicators of the good/bad decision. These inputs may be provided to train a neural network or other machine learning system.

In some embodiments, feedback can be used to further enhance analysis. Specifically, since a high proportion of fragment sequences do not indicate particularly good (or bad) experiences, it can be beneficial if a system presents to a user those fragments that is has identified as good or bad. By presenting these fragments and showing the assessment (good or bad) that the system has determined, the user can be enabled to confirm or correct the assessment. This input can then be fed back into the training algorithm either reinforcing the correct assessment or helping to avoid repetition of the mistake made.

Figure 4:
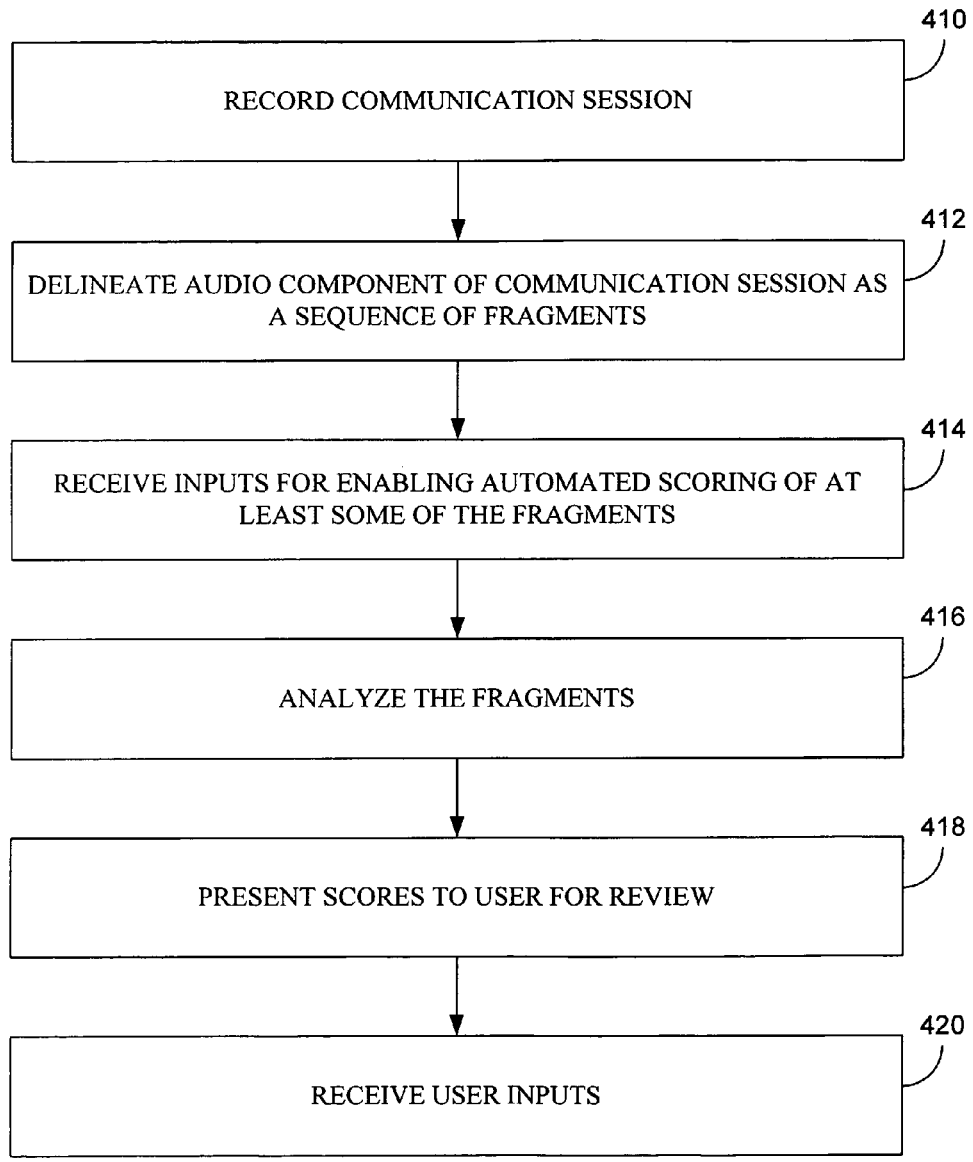
FIG. 4 is a flowchart illustrating functionality (or methods steps) that can be preformed by another embodiment of a system for analyzing communication sessions using fragments.

In this regard, FIG. 4 is a flowchart depicting functionality of an embodiment of a system that incorporates the use of feedback. As shown in FIG. 4, the functionality (or method) may be construed as beginning at block 410, in which a communication session is recorded. In block 412, an audio component of the communication session is delineated as a sequence of fragments. In block 414, inputs (such as manual scoring of a subset of the fragments and/or heuristics) are received for enabling automated scoring of at least some of the fragments. In block 416, the inputs are used in analyzing the fragments such that scores for at least some of the fragments that were not manually scored are produced. It should be noted that in some embodiments, the fragments that are manually evaluated may not be associated with the communication session that is being automatically scored.

In block 418, scores produced during automated analysis are presented to a user for review. By way of example, the scores can be presented to the user via a graphical user interface displayed on a display device. Then, in block 420, inputs from the user either confirming or correcting the scores are provided, with these inputs being used to update the analysis algorithm of the communication analyzer.

Figure 5:
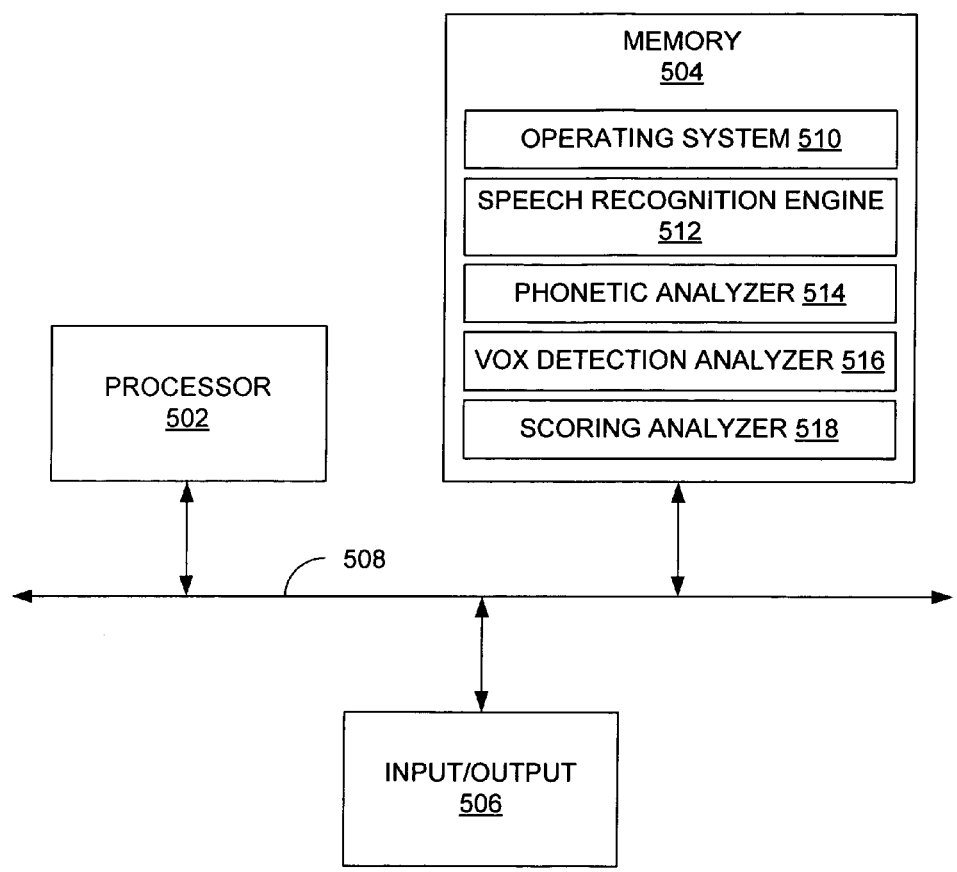
FIG. 5 is a diagram illustrating an embodiment of a system for analyzing communication sessions using fragments that is implemented by a computer.

FIG. 5 is a schematic diagram illustrating an embodiment of a communication analyzer that is implemented by a computer. Generally, in terms of hardware architecture, voice analyzer 500 includes a processor 502, memory 504, and one or more input and/or output (I/O) devices interface(s) 506 that are communicatively coupled via a local interface 508. The local interface 506 can include, for example but not limited to, one or more buses or other wired or wireless connections. The local interface may have additional elements, which are omitted for simplicity, such as controllers, buffers (caches), drivers, repeaters, and receivers to enable communications.

Further, the local interface may include address, control, and/or data connections to enable appropriate communications among the aforementioned components. The processor may be a hardware device for executing software, particularly software stored in memory.

The memory can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory, includes an operating system 510, as well as instructions associated with a speech recognition engine 512, a phonetic analyzer 514, a vox detection analyzer 516 and a scoring analyzer 518. Exemplary embodiments of each of which are described above.

It should be noted that embodiments of one or more of the systems described herein could be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more various functions such as receiving, capturing, intercepting and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence and compliance purposes, for example. Such integrated functionalities improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities. Referring back to the collections example outlined above, by using emotion and concept detection, companies can identify which customers are attempting to mislead collectors into believing that they are going to pay. The earlier the company is aware of a problem account, the more recourse options they will have. Thus, the speech analytics of the present disclosure can function as an early warning system to reduce losses.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

One should note that the flowcharts included herein show the architecture, functionality, and/or operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions (such as depicted in the flowcharts), can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations. Many variations and modifications may be made to the above-described embodiments. All such modifications and variations are intended to be included herein within the scope of this disclosure.

Therefore, at least the following is claimed:

1. A method for analyzing communication sessions using fragments comprising:
   delineating fragments of an audio component of a communication session by a communication analyzer, each of the fragments being attributable to a party of the communication session and representing a contiguous period of time during which that party was speaking; and
   automatically assessing quality of at least some of the fragments to determine a quality assessment of the communication session by the communication analyzer, wherein automatically assessing a quality of at least some of the fragments comprises assigning a quality score to each of the at least some of the fragments and automatically assessing further comprises manually assessing the quality of at least some of the fragments and using the quality assessments obtained manually as training inputs for machine learning algorithms for automatically assessing the quality of other fragments, and
   wherein the quality assessment is measured in accordance with a set of criteria that define the interaction between each party to the communication session.

2. The method of claim 1, wherein automatically assessing comprises analyzing a sequence of the fragments to determine which party was speaking and for how long.

3. The method of claim 1, wherein automatically assessing comprises defining rules and analyzing the fragments for characteristics embodied by the rules.

4. The method of claim 3, wherein the rules indicate that a quality assessment is to be lowered based on a determination that a party to a communication session is a contact center agent, and that the agent interrupted, by speaking, another party of the communication session that was speaking.

5. The method of claim 3, wherein the rules indicate that a quality assessment is to be lowered based on a determination that a party to a communication session is a contact center agent, and that the agent spoke for a duration exceeding a predetermined time limit without another party to the communication session speaking.

6. The method of claim 3, wherein the rules indicate that a quality assessment is to be lowered based on a determination that a party to a communication session is a contact center agent, and that the agent spoke at a volume level that at least one of: not less than a high volume threshold and not higher than a low volume threshold.

7. The method of claim 1, wherein automatically assessing comprises, with respect to the fragments analyzed, weighting the quality score associated with the fragments based, at least in part, on a time that the respective fragments occurred during the communication session.

8. The method of claim 1, wherein automatically assessing comprises performing script adherence analysis.

9. The method of claim 1, wherein automatically assessing comprises evaluating the communication session for fraud.

10. The method of claim 1, wherein at least a portion of the communication session is conducted using Internet Protocol packets.

11. The method of claim 1, further comprising recording the communication session.

12. The method of claim 1, wherein:
   one of the parties to the communication session is a contact center agent; and
   the method further comprises altering a work schedule of the agent based, at least in part, on the quality assessment of the communication session.

13. The method of claim 1, further comprising appending information to the fragments.

14. A system for analyzing communications using fragments comprising:
   a communication analyzer operative to:
   delineate fragments of an audio component of a communication session, each of the fragments being attributable to a party of the communication session and representing a contiguous period of time during which that party was speaking; and
   automatically assess quality of at least some of the fragments to determine a quality assessment of the communication session, wherein automatically assessing a quality of at least some of the fragments comprises assigning a quality score to each of the at least some of the fragments and automatically assessing further comprises manually assessing the quality of at least some of the fragments and using the quality assessments obtained manually as training inputs for machine learning algorithms for automatically assessing the quality of other fragments, and
   wherein the quality assessment is measured in accordance with a set of criteria that define the interaction between each party to the communication session.

15. The system of claim 14, wherein the system comprises a speech recognition engine operative to generate a transcript of at least a portion of the communication session.

16. The system of claim 14, wherein the system comprises a phonetic analyzer operative to generate a phoneme sequence of at least a portion of the communication session.

17. The system of claim 14, wherein the system comprises a vox detection analyzer operative to provide amplitude information corresponding to volume levels that the audio component exhibited during the communication session, the volume levels being used by the communication analyzer to determine locations at for defining fragments.

18. A non-transitory computer readable medium having a computer program stored thereon for performing the computer executable method of:
   delineating fragments of an audio component of a communication session, each of the fragments being attributable to a party of the communication session and representing a contiguous period of time during which that party was speaking; and
   automatically assessing quality of at least some of the fragments to determine a quality assessment of the communication session, wherein automatically assessing a quality of at least some of the fragments comprises assigning a quality score to each of the at least some of the fragments and automatically assessing further comprises manually assessing the quality of at least some of the fragments and using the quality assessments obtained manually as training inputs for machine learning algorithms for automatically assessing the quality of other fragments, and wherein the quality assessment is measured in accordance with a set of criteria that define the interaction between each party to the communication session.

19. The non-transitory computer readable medium of claim 18, wherein automatically assessing comprises analyzing a sequence of the fragments to determine which party was speaking and for how long.

20. The non-transitory computer readable medium of claim 18, wherein automatically assessing comprises defining rules and analyzing the fragments for characteristics embodied by the rules.

* * * * *